United States Patent
Kim et al.

(10) Patent No.: US 12,153,525 B2
(45) Date of Patent: Nov. 26, 2024

(54) METHOD AND APPARATUS FOR VERIFYING INTEGRITY IN MEMORY-DISAGGREGATED ENVIRONMENT

(71) Applicants: Electronics and Telecommunications Research Institute, Daejeon (KR); SYSGEAR CO., LTD., Seoul (KR)

(72) Inventors: Tae-Hoon Kim, Daejeon (KR); Kwang-Won Koh, Daejeon (KR); Kang-Ho Kim, Daejeon (KR); Chang-Dae Kim, Daejeon (KR); Sang-Ho Eom, Seoul (KR)

(73) Assignees: ELECTRONICS AND TELECOMMUNICATIONS RESEARCH INSTITUTE, Daejeon (KR); SYSGEAR CO., LTD., Seoul (KR)

( * ) Notice: Subject to any disclaimer, the term of this patent is extended or adjusted under 35 U.S.C. 154(b) by 0 days.

(21) Appl. No.: 18/126,229

(22) Filed: Mar. 24, 2023

(65) Prior Publication Data
US 2023/0305964 A1 Sep. 28, 2023

(30) Foreign Application Priority Data

Mar. 25, 2022 (KR) .......... 10-2022-0037299
Feb. 3, 2023 (KR) .......... 10-2023-0014978

(51) Int. Cl.
*G06F 12/0862* (2016.01)
*G06F 12/0864* (2016.01)

(52) U.S. Cl.
CPC ...... *G06F 12/0862* (2013.01); *G06F 12/0864* (2013.01)

(58) Field of Classification Search
CPC .................. G06F 12/0862; G06F 12/0864
See application file for complete search history.

(56) References Cited

U.S. PATENT DOCUMENTS

| | | | |
|---|---|---|---|
| 7,577,848 | B2 | 8/2009 | Schwartz et al. |
| 10,168,934 | B2 | 1/2019 | Cho et al. |
| 11,750,695 | B1 * | 9/2023 | Gupta ............. H04L 43/062 709/226 |
| 2017/0153908 | A1 | 6/2017 | Han et al. |
| 2017/0310683 | A1 * | 10/2017 | Ashiya ............ H04L 43/0858 |
| 2020/0153627 | A1 * | 5/2020 | Wentz ............. G06F 21/6218 |

(Continued)

FOREIGN PATENT DOCUMENTS

| | | |
|---|---|---|
| KR | 10-2006-0083850 | 7/2006 |
| KR | 10-2015-0019845 | 2/2015 |
| KR | 10-1946620 | 2/2019 |

*Primary Examiner* — Prasith Thammavong
(74) *Attorney, Agent, or Firm* — KILE PARK REED & HOUTTEMAN PLLC

(57) ABSTRACT

Disclosed herein are a method and apparatus for verifying integrity in a memory-disaggregated environment. The method for verifying integrity in a memory-disaggregated environment includes receiving write data and multiple hash values generated based on write data from a remote memory, and verifying integrity of the write data based on the write data and the hash values, wherein verifying the integrity of the write data comprises selecting a hash value for the integrity verification based on an access latency of the remote memory.

8 Claims, 8 Drawing Sheets

(56) References Cited

U.S. PATENT DOCUMENTS

2020/0364094 A1* 11/2020 Kahle ................ G06F 12/0842
2021/0105281 A1    4/2021 Shin et al.
2021/0117340 A1    4/2021 Trikalinou et al.

* cited by examiner

METHOD AND APPARATUS FOR VERIFYING INTEGRITY IN MEMORY-DISAGGREGATED ENVIRONMENT

CROSS REFERENCE TO RELATED APPLICATIONS

This application claims the benefit of Korean Patent Application No. 10-2022-0037299, filed Mar. 25, 2022, and 10-2023-0014978, filed Feb. 3, 2023, which are hereby incorporated by reference in their entireties into this application.

BACKGROUND OF THE INVENTION

1. Technical Field

The present disclosure relates generally to memory management technology in a memory-disaggregated environment.

In particular, the present disclosure relates to technology for verifying the integrity of data stored in remote memory in a memory-disaggregated environment including local memory and the remote memory.

2. Description of the Related Art

With the development of computer technology and networking technology, required computing resources have increased. Further, with the development of networking technology, cloud systems for sharing computing resources have been provided.

In particular, the speed at which the required capacity of memory resources increases may be further accelerated compared to other computing resources as the amount of data to be processed increases. Accordingly, there are required a memory management apparatus and a memory management method that are capable of responding to increased memory resources.

A virtualization system for providing disaggregated memory refers to a system which allows a subset of memory required by a virtual machine to perform a task to be located in another system connected thereto through an Input/Output (I/O) device, other than a physical machine which runs the corresponding virtual machine, and a virtualization system which utilizes nonvolatile memories supporting block addressing. With the popularization of an in-memory computing environment, this gives the opportunity to increase memory capacity through the use of an existing commercial system.

In a memory-disaggregated environment, data requiring fast memory access is located in local memory present in a host in which virtual machines are operated, and the remaining data is located in remote memory or the like, and thus high memory access performance may be obtained, and memory having higher capacity than that of random access memory controlled by a computer memory sub-system may be provided. That is, arbitrary data may be located in local memory or remote memory depending on the access properties thereof.

However, in the memory-disaggregated environment, memory data in a local node (i.e., local memory) is trusted, whereas a remote node (i.e., remote memory) may have a security problem due to attacks made by malicious nodes, an error problem or the like when service is performed on multiple nodes having disaggregated memory. Further, as memory data is transmitted over a network, problems caused by data loss, missing, forgery, etc. resulting from physical failures may arise. When problems arise, application errors or data reliability problems may occur. Therefore, in order to solve these problems, the verification of integrity of data transmitted from the remote memory is required.

PRIOR ART DOCUMENTS

Patent Documents (Patent Document 1) Korean Patent Application Publication No. 10-2015-0019845 (Title of invention: Method and Apparatus for monitoring Data Integrity in Shared Memory Environment).

SUMMARY OF THE INVENTION

Accordingly, the present disclosure has been made keeping in mind the above problems occurring in the prior art, and an object of the present disclosure is to provide a disaggregated memory management apparatus, a disaggregated memory management method, and a program, which verify the integrity of data received from remote memory in a memory-disaggregated environment and prevent latency from occurring during integrity verification.

In accordance with an aspect of the present disclosure to accomplish the above object, there is provided a method for verifying integrity in a memory-disaggregated environment, the method being performed by an integrity verification apparatus, the method including receiving write data and multiple hash values generated based on write data from a remote memory; and verifying integrity of the write data based on the write data and the hash values, wherein verifying the integrity of the write data includes selecting a hash value for the integrity verification based on an access latency of the remote memory.

The hash values may include a first hash value corresponding to a first segment set including at least one of multiple segments, obtained by partitioning the write data, and a second hash value corresponding to a second segment set including segments more than segments in the first segment set.

Verifying the integrity of the write data may include verifying the integrity of the write data using the first hash value when the access latency is greater than a threshold value, and verifying the integrity of the write data using the second hash value when the access latency is less than or equal to the threshold value.

Verifying the integrity of the write data may include verifying the integrity of the write data when the access latency is less than or equal to a verification threshold value.

Verifying the integrity of the write data may further include verifying the integrity of write data for which the access latency is less than or equal to the verification threshold value, and thereafter verifying the integrity of write data for which the access latency is greater than the verification threshold value.

Verifying the integrity of the write data may include verifying on-demand data of the write data with higher priority than that of prefetch data.

The first hash value may be generated using the first segment set and an identifier of a remote node including the remote memory, and the second hash value may be generated using the second segment set and the identifier of the remote node.

The hash values may include hash values respectively corresponding to multiple segment sets, each including at least one of the multiple segments obtained by partitioning the write data, wherein the multiple segment sets include segment sets for which ratios of sizes of segment sets to a size of the write data are different from each other.

In accordance with another aspect of the present disclosure to accomplish the above object, there is provided an apparatus for verifying integrity in a memory-disaggregated environment, including a reception unit for receiving write data and multiple hash values generated based on the write data from a remote memory; and an integrity verification unit for verifying integrity of the write data based on the write data and the hash values, wherein the integrity verification unit selects a hash value for the integrity verification based on an access latency of the remote memory.

The hash values may include a first hash value corresponding to a first segment set including at least one of multiple segments, obtained by partitioning the write data, and a second hash value corresponding to a second segment set including segments more than segments in the first segment set.

The integrity verification unit may be configured to verify the integrity of the write data using the first hash value when the access latency is greater than a threshold value, and verify the integrity of the write data using the second hash value when the access latency is less than or equal to the threshold value.

The integrity verification unit may be configured to verify the integrity of the write data when the access latency is less than or equal to a verification threshold value.

The integrity verification unit may be configured to verify the integrity of write data for which the access latency is less than or equal to the verification threshold value, and thereafter verify the integrity of write data for which the access latency is greater than the verification threshold value.

The integrity verification unit may be configured to verify on-demand data of the write data with higher priority than that of prefetch data.

The first hash value may be generated using the first segment set and an identifier of a remote node including the remote memory, and the second hash value may be generated using the second segment set and the identifier of the remote node.

The hash values may include hash values respectively corresponding to multiple segment sets, each including at least one of the multiple segments obtained by partitioning the write data, and the multiple segment sets may include segment sets for which ratios of sizes of segment sets to a size of the write data are different from each other.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
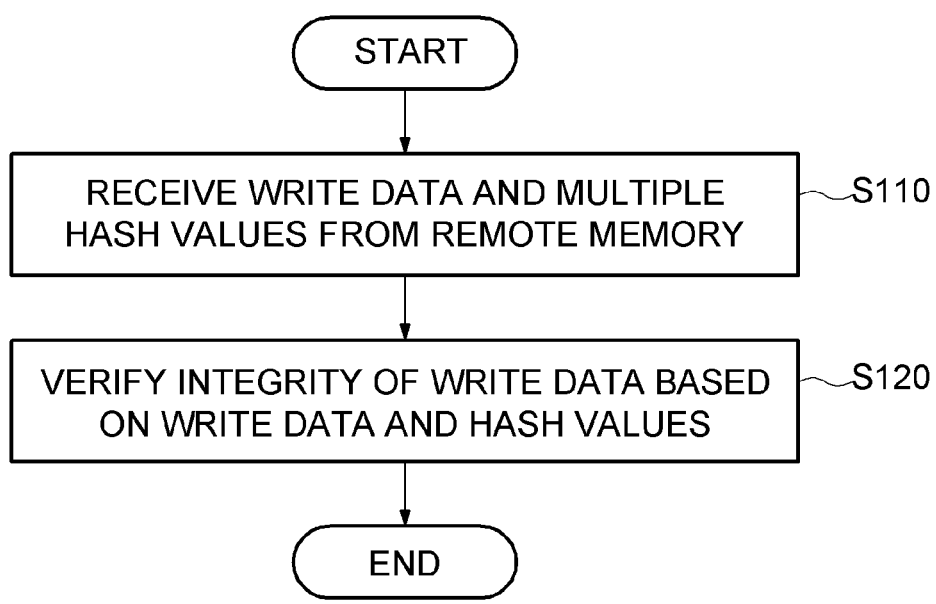
FIG. 1 is a flowchart illustrating a method for verifying integrity in a memory-disaggregated environment according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

FIG. 1 is a flowchart illustrating a method for verifying integrity in memory-disaggregated environment according to an embodiment of the present disclosure.

The method for verifying integrity in a memory-disaggregated environment according to the embodiment of the present disclosure may be performed by an apparatus for verifying integrity in the memory-disaggregated environment, which includes a disaggregated memory manager.

Referring to FIG. 1, the method for verifying integrity in the memory-disaggregated environment according to the embodiment of the present disclosure may include step S110 receiving write data and multiple hash values generated based on the write data from remote memory, and step S120 of verifying the integrity of the write data based on the write data and the hash values, wherein the step of verifying the integrity of the write data may include the step of selecting a hash value for the integrity verification based on the access latency of the remote memory.

Here, the hash values may include a first hash value corresponding to a first segment set including at least one of multiple segments, obtained by partitioning the write data, and a second hash value corresponding to a second segment set including segments more than those in the first segment set.

Here, step S120 of verifying the integrity of the write data may include the step of verifying the integrity of the write data using the first hash value when the access latency is greater than a threshold value, and the step of verifying the integrity of the write data using the second hash value when the access latency is less than or equal to the threshold value.

Here, step S120 of verifying the integrity of the write data may include the step of verifying the integrity of the write data when the access latency is less than or equal to a verification threshold value.

Here, step S120 of verifying the integrity of the write data may include the step of verifying the integrity of write data for which the access latency is less than or equal to the verification threshold value, and thereafter verifying the integrity of write data for which the access latency is greater than the verification threshold value.

Here, step S120 of verifying the integrity of the write data may include verifying the integrity of on-demand data of the write data with higher priority than that of prefetch data of the write data.

Here, the first hash value may be generated using the first segment set and the identifier of a remote node including the remote memory, and the second hash value may be generated using the second segment set and the identifier of the remote node.

Here, the hash values may include hash values respectively corresponding to multiple segment sets, each including at least one of the multiple segments obtained by partitioning the write data, wherein the multiple segment sets may include segment sets for which the ratios of the sizes of segment sets to the size of the write data are different from each other.

Figure 2:
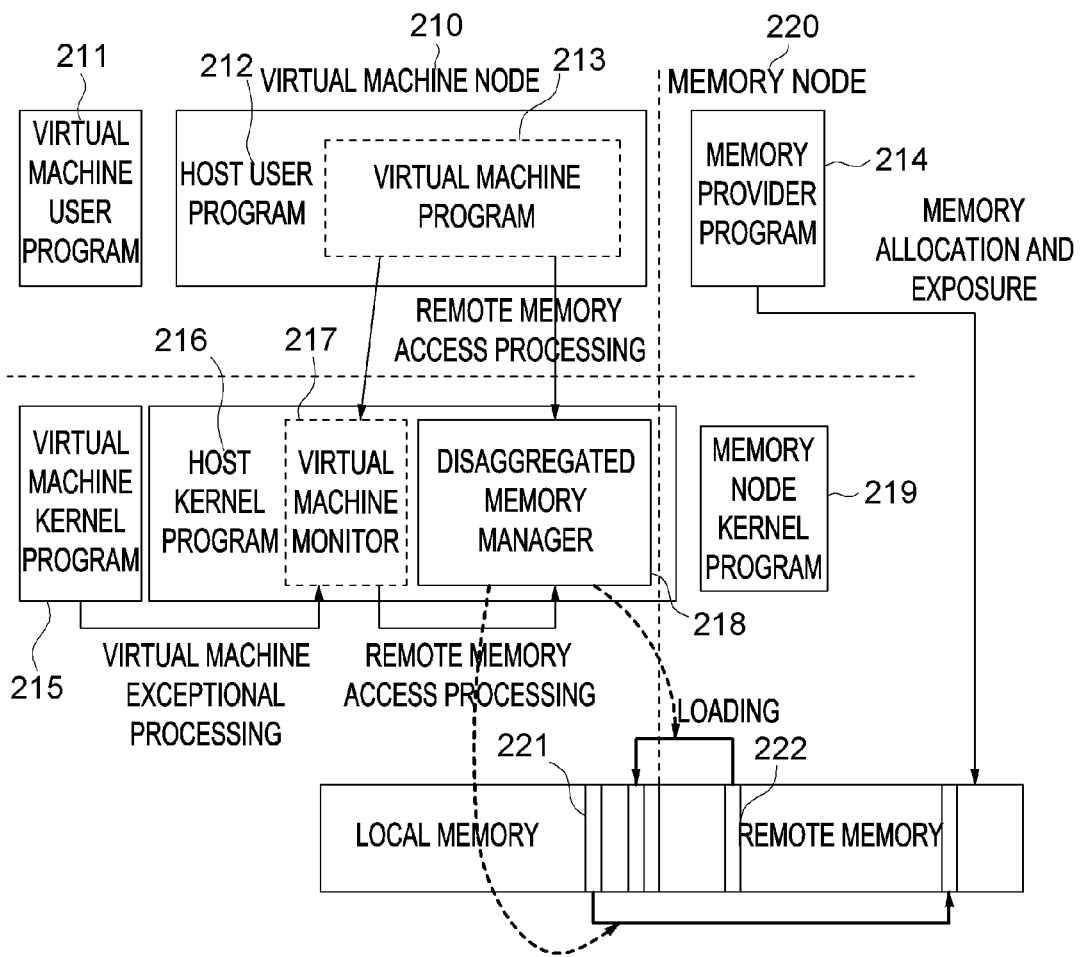
FIG. 2 is a block diagram illustrating the configuration of a disaggregated memory virtualization system according to an embodiment of the present disclosure.

FIG. 2 is a block diagram illustrating the configuration of a disaggregated memory virtualization system according to an embodiment of the present disclosure.

Referring to FIG. 2, the virtualization system may include a disaggregated memory manager 218. The disaggregated memory manager 218 may process access to remote memory occurring in a virtual machine node 210 (i.e., a local node). For example, when the virtual machine node 210 desires to access the remote memory, the disaggregated memory manager 218 may load the remote memory into local memory.

Further, the disaggregated memory manager 218 may store the local memory in the remote memory. In an example, the disaggregated memory manager 218 may store a first memory page 221 from the local memory in the remote memory based on the operation of the virtual machine node 210. In this case, the first memory page 221 may be an arbitrary memory page in the local memory, and is not limited to the above-described embodiment. That is, the disaggregated memory manager 218 may store the local memory in the remote memory.

Furthermore, the disaggregated memory manager 218 may load a second memory page 222 in the remote memory into the local memory based on the operation of the virtual machine node 210. Here, the second memory page 221 may be an arbitrary memory page present in the remote memory, and is not limited to the above-described embodiment. In this case, the disaggregated memory manager 218 may map the local memory into which the second memory page is loaded to an address space used by the virtual machine node 210, and the virtual machine node 210 may use the local memory into which the second memory page is loaded, by mans of memory mapping. That is, the disaggregated memory manager 218 may allow a kernel or an application running on a virtual machine to access the corresponding memory. On the other hand, the disaggregated memory manager 218 may store memory, which is not accessed by the virtual machine node 210, in the remote memory. That is, memory used by the virtual machine node 210 may be checked and loaded into the local memory, and memory that is not used by the virtual machine node 210 may be stored in the remote memory.

Referring to FIG. 2, a virtual machine kernel program 215 and a host kernel program 216 may be present in the virtual machine node 210 at kernel level. Meanwhile, a memory node kernel program 219 may be present in a memory node 220 (i.e., a remote node) at kernel level. The above-described disaggregated memory manager 218 may control processing of access to the remote memory based on the virtual machine kernel program 215 using the host kernel program 216. That is, virtual machine monitoring may be performed by a virtual machine monitor 217 based on a virtual machine program 211 at user level, and the disaggregated memory manager 218 may perform processing of access to the remote memory based on the virtual machine monitoring.

In such remote memory access processing, access latency may occur. Such latency may be reduced and processing performance may be improved by a prefetch operation of fetching in advance a memory page to be used from the remote memory node.

The disaggregated memory manager 218 may generate hash values for write data to be stored in the remote memory, transmit the hash values, together with the write data, to the remote memory, and verify data integrity based on write data and hash values received from the remote memory. A detailed scheme for data integrity verification will be described later.

Figure 3:
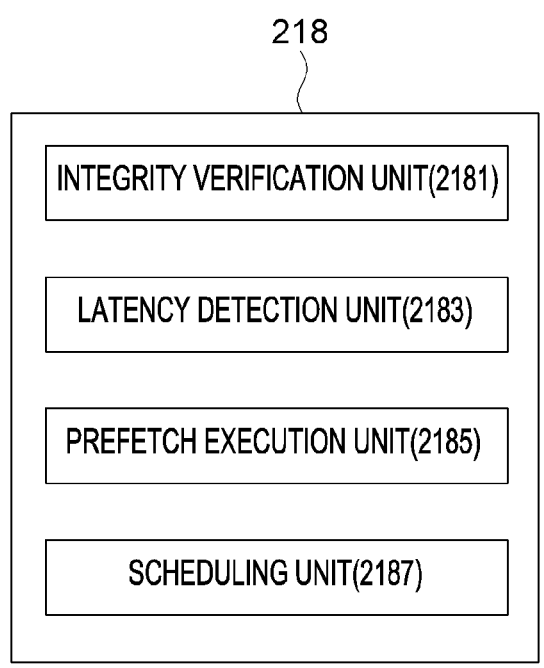
FIG. 3 is a block diagram illustrating the configuration of a disaggregated memory manager according to an embodiment of the present disclosure.

FIG. 3 is a block diagram illustrating the configuration of the disaggregated memory manager 218 according to an embodiment of the present disclosure.

Referring to FIG. 3, the disaggregated memory manager 218 may include an integrity verification unit 2181, a latency detection unit 2183, a prefetch execution unit 2185, and a scheduling unit 2187. The integrity verification unit 2181, the latency detection unit 2183, the prefetch execution unit 2185, and the scheduling unit 2187 may be provided in an accelerator present in the disaggregated memory manager 218. The accelerator may be connected to a Network Interface Card (MC) which accesses remote memory, and access to the remote memory may be performed through the accelerator.

The integrity verification unit 2181 may partition write data to be stored in the remote memory into multiple segments, generate and transmit multiple hash values for segments sets, each including at least one of the multiple segments resulting from partitioning, and verify the integrity of the write data based on at least one of the multiple hash values.

Here, the hash values may be generated using a hash function which receives the write data as input. For example, in order to generate the hash values, a hash function such as MD5 or SHA (SHA-256 or SHA-512) may be used. In an embodiment, the integrity verification unit 2181 may generate the hash values based on the unique code (IP address, a machine ID, or the like) of a remote node 220 in addition to the write data.

For example, the integrity verification unit 2181 may partition the entire write data into multiple segments, and may set a first segment set, a second segment set, a third segment set, a fourth segment set, and a fifth segment set, which occupies proportions of 10%, 20%, 50%, 70%, and 100% of the entire write data, respectively. The integrity verification unit 2181 may generate hash values (e.g., a first hash value to a fifth hash value) for respective multiple segment sets. The multiple hash values (e.g., the first to fifth hash values), together with the write data, may be transmitted to the remote memory, and may be stored in the remote memory.

The latency detection unit 2183 may detect latency indicating a delay time in access to the remote memory. A hash value for integrity verification may be selected depending on the latency.

The latency of the remote memory in the case where data stored in the remote memory is read may refer to a time period from a time point at which the local node 210 transmits a read request to a time point at which the local node 210 receives the data transmitted from the remote node 220 after data requested to be read is read from the remote memory and is transmitted. The latency of the remote memory may vary with network status, the device performance of the remote node 220, etc. The latency of the remote memory may include the current latency of the remote memory, the average latency of the remote memory for a predetermined period of time, the frequency of access to the remote memory, etc.

The integrity verification unit 2181 may verify the integrity of the data received from the remote memory. The integrity verification unit 2181 may select a hash value for integrity verification based on the detected latency. In an embodiment, the integrity verification unit 2181 may verify integrity based on a hash value for a segment set including fewer segments as the detected latency is higher.

For example, when latency does not occur, the integrity verification unit 2181 may verify the integrity of the write data based on the fifth hash value (i.e., a hash value generated based on the fifth segment set including segments occupying a proportion of 100% of the entire write data).

When lower-level latency occurs, the integrity verification unit 2181 may verify the integrity of the write data based on the fourth hash value (i.e., a hash value generated based on the fourth segment set including segments occupying a proportion of 70% of the entire write data).

When higher-level latency occurs, the integrity verification unit 2181 may verify the integrity of the write data based on the first hash value (i.e., a hash value generated based on the first segment set including segments occupying a proportion of 10% of the entire write data).

In an embodiment, the integrity verification unit 2181 may not verify the integrity of the write data from the case where the detected latency is equal to or greater than a certain threshold value (from a latency value increased to such an extent that a delay enough to stop a system process occurs).

The prefetch execution unit 2185 may perform a prefetch operation of fetching and storing in advance data expected to be accessed, among pieces of data stored in the remote memory. A processing speed in the case where data integrity verification is performed may be lower than that in the case where data integrity verification is not performed, and thus the prefetch operation may be performed so as to improve the processing speed and prevent latency.

The scheduling unit 2187 may separate on-demand data required by the corresponding system and prefetch data, and may assign higher priority to integrity verification on the on-demand data. Because the on-demand data required by the system is data required to be accessed in real time, the on-demand data needs to be processed with higher priority than that of the prefetch data. The scheduling unit 2187 may schedule integrity verification so that the verification of integrity of the on-demand data is processed with higher priority than that of the prefetch data.

Figure 4:
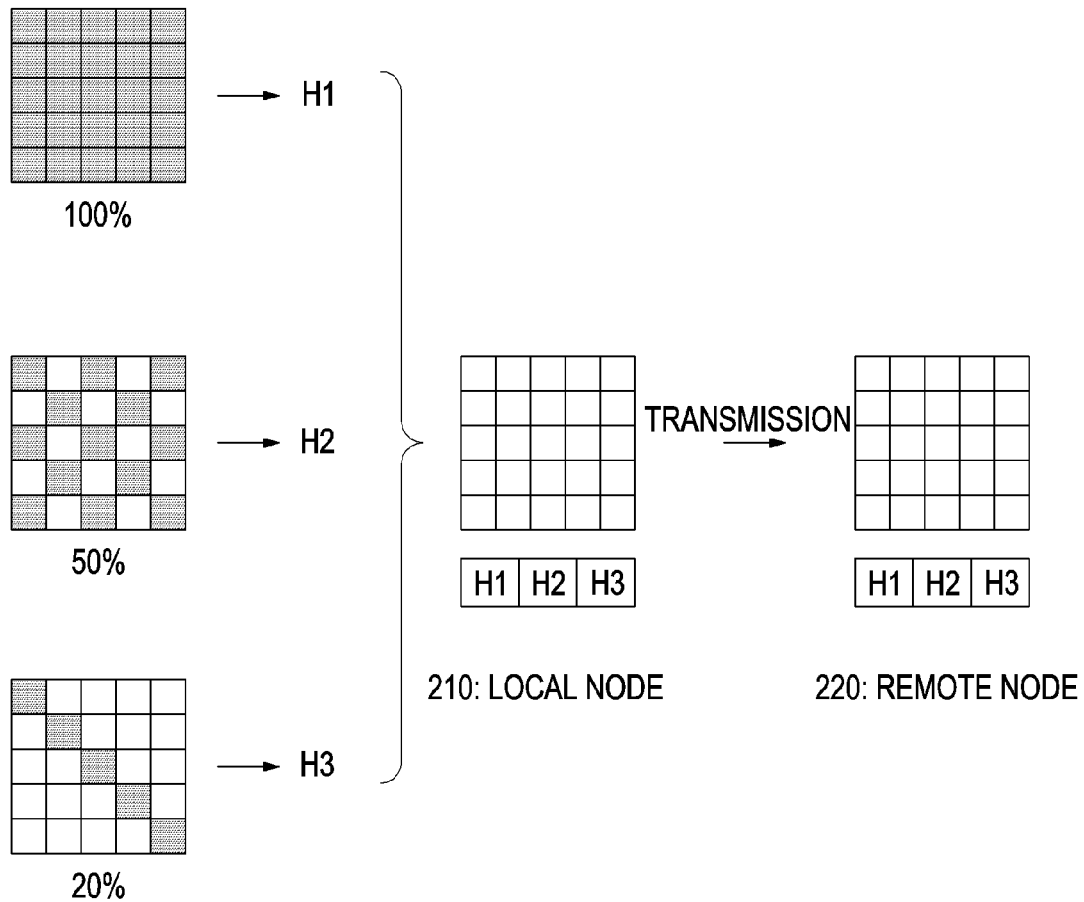
FIG. 4 is a conceptual diagram illustrating a method for generating and transmitting hash values according to an embodiment of the present disclosure.

FIG. 4 is a conceptual diagram illustrating a method for generating and transmitting hash values according to an embodiment of the present disclosure.

Referring to FIG. 4, the disaggregated memory manager 218 may partition write data to be stored in remote memory into multiple segments, and may verify the integrity of the write data based on multiple hash values for segment sets, each including at least one segment. The write data illustrated in FIG. 4 (all segments occupying 100%) may indicate one page or indicate one block including multiple pages. When the write data indicates a block, some segments may indicate one or more pages. Further, when the write data indicates a page, some segments may indicate some areas into which the page is to be divided.

The disaggregated memory manager 218 may generate multiple hash values based on at least part of the write data. In an embodiment, the disaggregated memory manager 218 may generate multiple hash values H1, H2, and H3 based on the entire record data (100%) and parts of the write data (50%, 20%, etc.). The disaggregated memory manager 218 transmits the generated multiple hash values H1, H2, and H3, together with the write data, to the remote node 220. The remote node 220 may store the write data and the multiple hash values H1, H2, and H3 in the remote memory.

When a request to read the data stored in the remote memory is received, the disaggregated memory manager 218 may receive the write data and multiple hash values H1, H2, and H3 from the remote memory. The disaggregated memory manager 218 may select from one hash value from among the multiple hash values H1, H2, and H3 based on latency. When the latency is high, the disaggregated memory manager 218 may select a hash value generated with a low segment proportion (e.g., H3 generated with 20% of all segments), and may generate a verification hash value from segments corresponding to the selected hash value H3 out of the write data.

The disaggregated memory manager 218 may compare the verification hash value with a received hash value, and may determine that the write data satisfies data integrity when the two values match each other. When the two values do not match each other, the disaggregated memory manager 218 may determine that the write data does not satisfy the data integrity.

Figure 5:
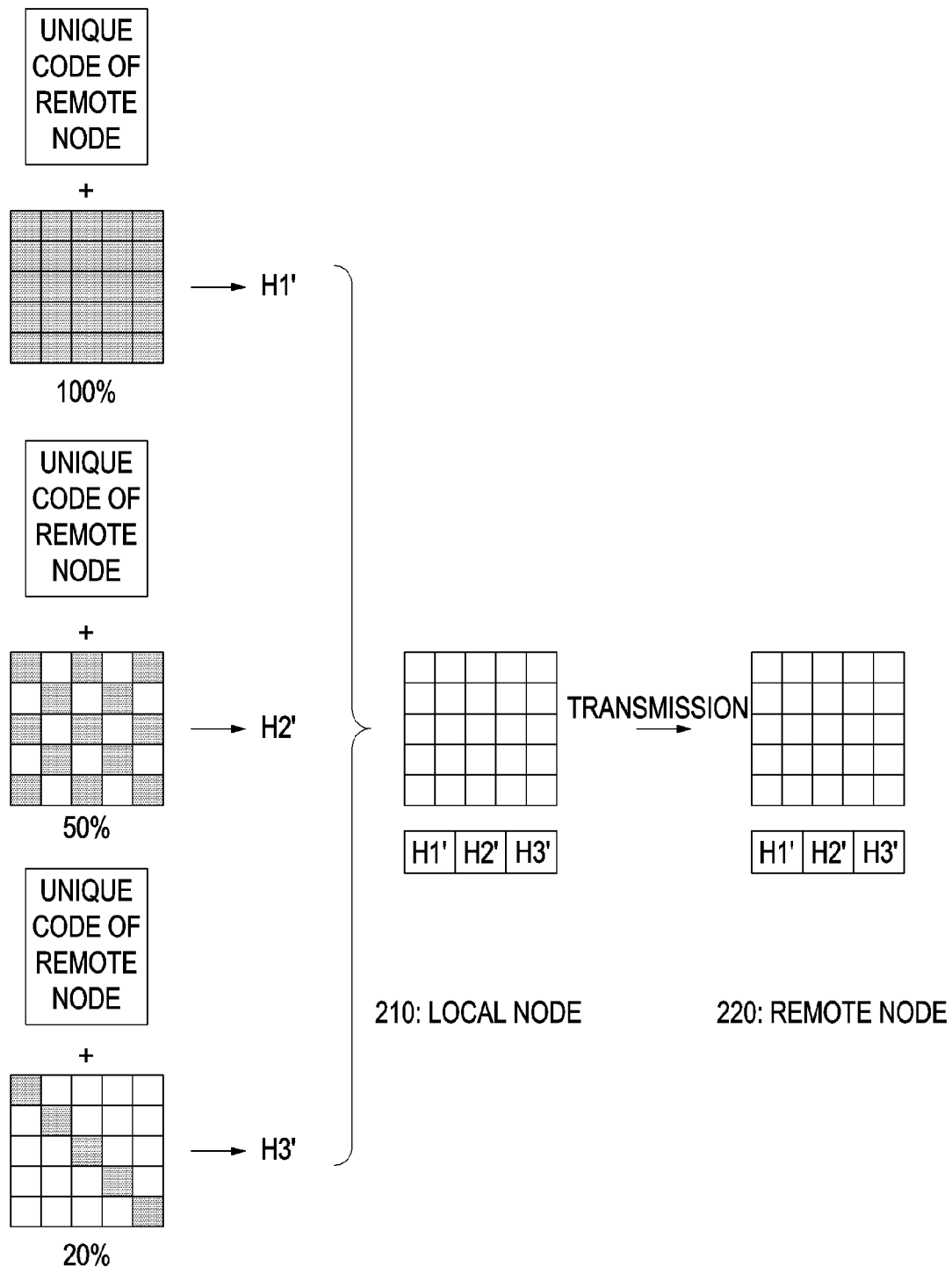
FIG. 5 is a conceptual diagram illustrating a method for generating and transmitting hash values according to another embodiment of the present disclosure.

FIG. 5 is a conceptual diagram illustrating a method for generating and transmitting hash values according to another embodiment of the present disclosure.

Referring to FIG. 5, it can be seen that the multiple hash values are generated by including the unique code of the remote node as a seed value. That is, in the embodiment of FIG. 5, the disaggregated memory manager 218 may generate multiple hash values based on the unique code of the remote node 200, such as the IP address or machine ID of the remote node 220, and the write data (all or part thereof).

According to this embodiment, it may be possible to verify the source of the remote node as well as the integrity of the write data. That is, when write data is received from a non-verified remote node 220, the disaggregated memory manager 218 may detect that the received write data is not the write data from a verified remote node 220 because a hash value generated based on the write data and the unique code of the remote node does not match the received hash value.

Figure 6:
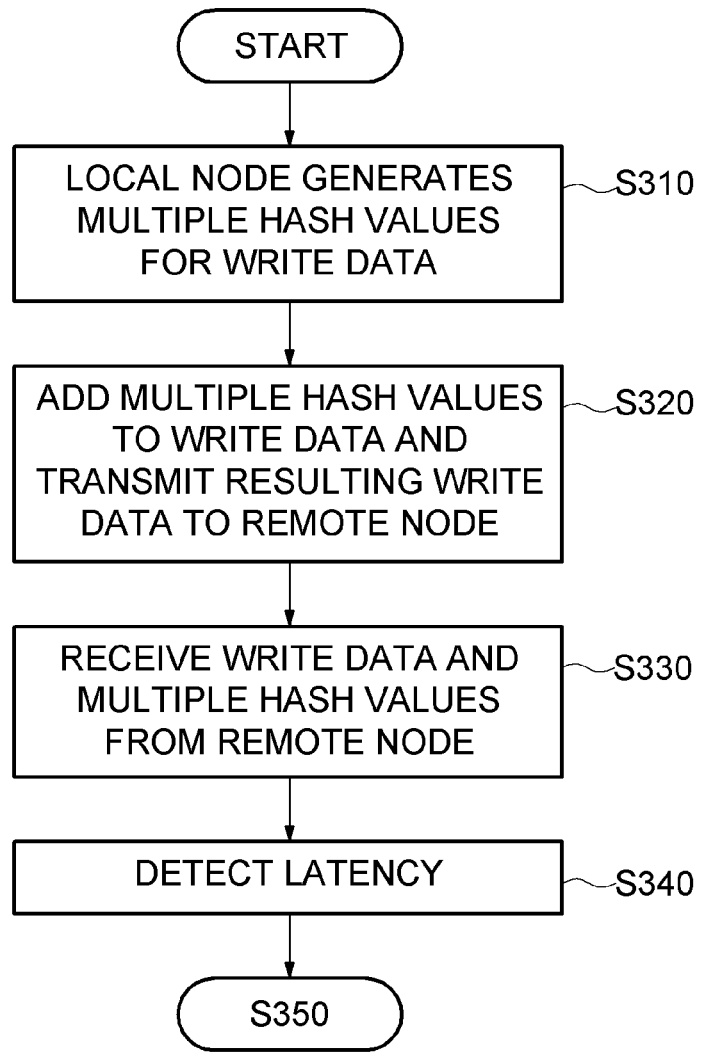
FIGS. 6 and 7 are flowcharts illustrating a method for verifying integrity according to an embodiment of the present disclosure.
Figure 7:
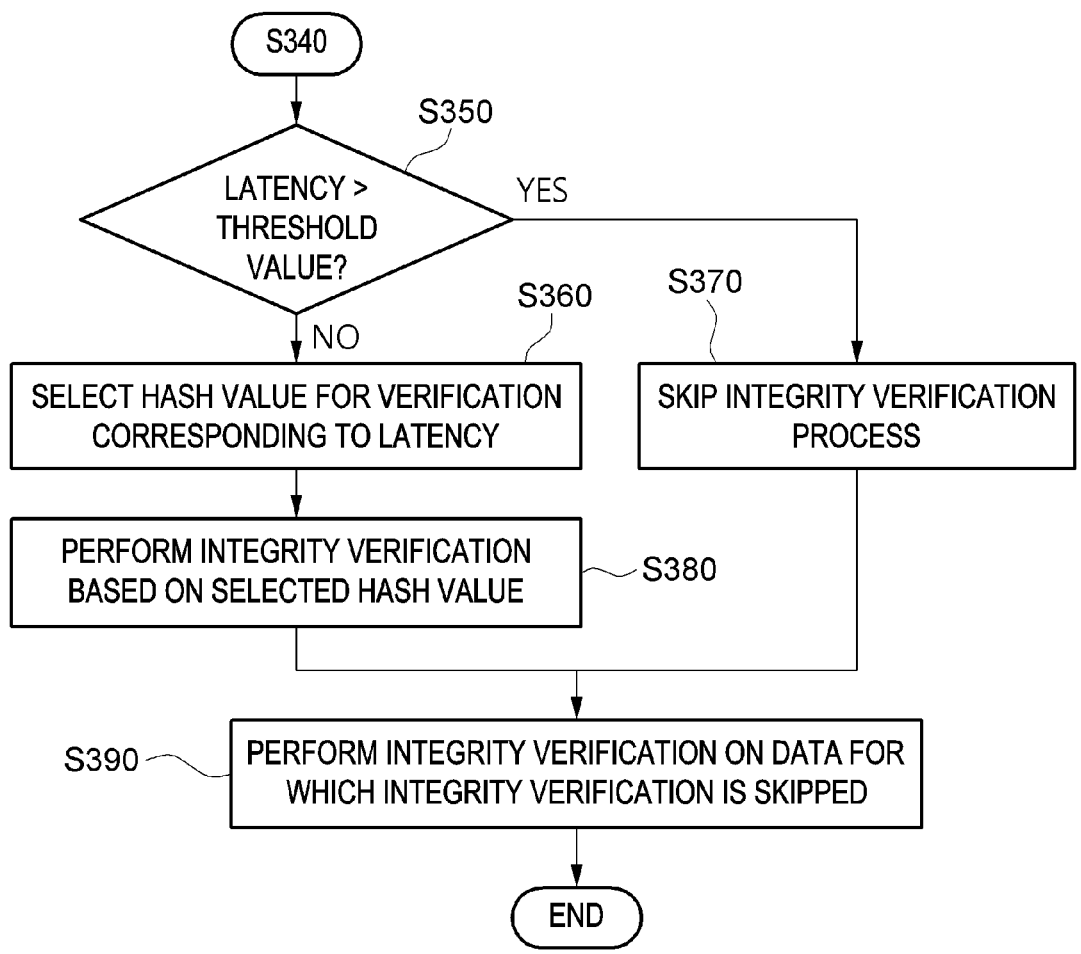

FIGS. 6 and 7 are flowcharts illustrating a method for verifying integrity according to an embodiment of the present disclosure.

Referring to FIGS. 6 and 7, when write data is written to remote memory, the local node 210 may generate multiple hash values H1, H2, and H3 for the write data at step S310, and may transmit the write data and the multiple hash values H1, H2, and H3 to the remote node 220. The remote memory of the remote node 220 may store the write data and the multiple hash values H1, H2, and H3 at step S320.

When a request to read the write data stored in the remote node 220 is received, the remote node 220 may transmit the write data related to the read request and the multiple hash values H1, H2, and H3 to the local node 210. The local node 210 may receive the write data and the multiple hash values H1, H2, and H3, which are transmitted from the remote node 220, at step S330.

The local node 210 may detect the latency of the remote node 220 at step S340, and may determine whether the detected latency is less than or equal to a threshold voltage at step S350. When the latency is greater than the threshold value at step S350, the local node 200 may skip an integrity verification process on the write data at step S370. Here, the threshold value may be a latency value increased to such an extent that the normal operation of the local node 210 is impossible when the latency has a high value due to network status or the device performance of the remote node 200 and then data integrity is verified.

When the latency is not greater than the threshold value at step S350, the local node 200 may select a hash value for verification corresponding to the latency at step S360, and may perform an integrity verification process on the write data illustrated in FIG. 4 or 5 based on the selected hash value at step S380.

Thereafter, integrity verification may be performed on the write data on which integrity verification is skipped at step S390. The write data on which integrity verification is skipped may include write data on which the integrity verification process is skipped when the latency is greater than the threshold value at step S370. Furthermore, the write data on which integrity verification is skipped may include a segment set (segments occupying 30%) including the remaining segments when integrity verification is performed using a hash value selected for a segment set (e.g., a set of segments occupying 70% of the entire write data) corresponding to part of the write data. With respect to such data, integrity verification is skipped when the data is used, and is performed later on the data, thus securing data integrity while preventing latency from occurring.

Figure 8:
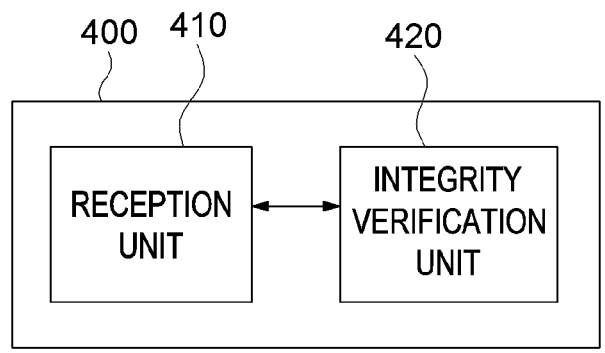
FIG. 8 is a block diagram illustrating an apparatus for verifying integrity in a memory-disaggregated environment according to an embodiment.

FIG. 8 is a block diagram illustrating an apparatus for verifying integrity in a memory-disaggregated environment according to an embodiment.

Referring to FIG. 8, the apparatus for verifying integrity in a memory-disaggregated environment according to the embodiment of the present disclosure may include a reception unit 410 for receiving write data and multiple hash values generated based on the write data from remote memory, and an integrity verification unit 420 for verifying the integrity of the write data based on the write data and the hash values, wherein the integrity verification unit step 420 may select a hash value for the integrity verification based on the access latency of the remote memory.

Here, the hash values may include a first hash value corresponding to a first segment set including at least one of multiple segments, obtained by partitioning the write data, and a second hash value corresponding to a second segment set including segments more than those in the first segment set.

Here, the integrity verification unit 420 may verify the integrity of the write data using the first hash value when the access latency is greater than a threshold value, and may verify the integrity of the write data using the second hash value when the access latency is less than or equal to the threshold value.

Here, when the access latency is less than or equal to a verification threshold value, the integrity verification unit 420 may verify the integrity of the write data.

Here, the integrity verification unit 420 may verify the integrity of write data for which the access latency is less than or equal to the verification threshold value, and thereafter verify the integrity of write data for which the access latency is greater than the verification threshold value.

Here, the integrity verification unit 420 may verify the integrity of on-demand data of the write data with higher priority than that of prefetch data of the write data.

Here, the first hash value may be generated using the first segment set and the identifier of a remote node including the remote memory, and the second hash value may be generated using the second segment set and the identifier of the remote node.

Here, the hash values may include hash values respectively corresponding to multiple segment sets, each including at least one of multiple segments obtained by partitioning the write data, wherein the multiple segment sets may include segment sets for which the ratios of the sizes of segment sets to the size of the write data are different from each other.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly"

or the like, the corresponding component may not be an essential component required in order to apply the present disclosure.

According to embodiments of the present disclosure, there can be provided a disaggregated memory management apparatus, a disaggregated memory management method, and a program, which include a configuration that generates hash values for write data to be stored in remote memory, transmits the hash values together with the write data to the remote memory, and verifies data integrity based on write data and hash values received from the remote memory, thus verifying the integrity of data received from the remote memory in a memory-disaggregated environment and preventing latency from occurring during integrity verification.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for verifying integrity in a memory-disaggregated environment, comprising:
    receiving write data corresponding to multiple hash values, the write data read from a remote memory, the multiple hash values generated based on the write data, the memory-disaggregated environment including local memory and the remote memory;
    selecting a hash value among the multiple hash values for integrity verification based on an access latency of the remote memory to control latency from occurring during the integrity verification; and
    verifying integrity of the write data read from the remote memory based on the hash value.

2. The method of claim 1, wherein the multiple hash values include a first hash value corresponding to a first segment set including at least one of multiple segments, obtained by partitioning the write data, and a second hash value corresponding to a second segment set including segments more than segments in the first segment set.

3. The method of claim 2, wherein verifying the integrity of the write data comprises:
    verifying the integrity of the write data using the first hash value when the access latency is greater than a threshold value, and verifying the integrity of the write data using the second hash value when the access latency is less than or equal to the threshold value.

4. The method of claim 1, wherein verifying the integrity of the write data comprises:
    verifying the integrity of the write data when the access latency is less than or equal to a verification threshold value.

5. The method of claim 4, wherein verifying the integrity of the write data further comprises:
    verifying the integrity of write data for which the access latency is less than or equal to the verification threshold value, and thereafter verifying the integrity of write data for which the access latency is greater than the verification threshold value.

6. The method of claim 1, wherein verifying the integrity of the write data comprises:
    verifying on-demand data of the write data with higher priority than that of prefetch data.

7. The method of claim 2, wherein:
    the first hash value is generated using the first segment set and an identifier of a remote node including the remote memory, and
    the second hash value is generated using the second segment set and the identifier of the remote node.

8. The method of claim 1, wherein the multiple hash values include hash values respectively corresponding to multiple segment sets, each including at least one of multiple segments obtained by partitioning the write data, wherein the multiple segment sets include segment sets for which ratios of sizes of segment sets to a size of the write data are different from each other.

* * * * *